Dec. 16, 1947.  A. W. KINGSTON  2,432,668
PRODUCTION OF OPTICAL LENSES, PRISMS, AND LIKE OPTICAL ELEMENTS
Filed Jan. 12, 1944  3 Sheets-Sheet 1

ARTHUR W. KINGSTON
INVENTOR
by his attorneys
Stebbins, Blenko & Webb

Dec. 16, 1947. A. W. KINGSTON 2,432,668
PRODUCTION OF OPTICAL LENSES, PRISMS, AND LIKE OPTICAL ELEMENTS
Filed Jan. 12, 1944 3 Sheets-Sheet 2
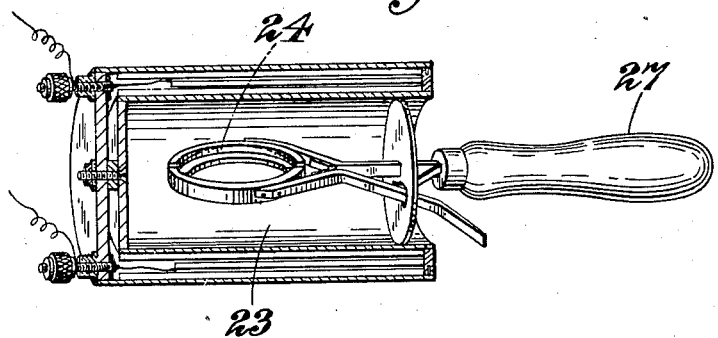
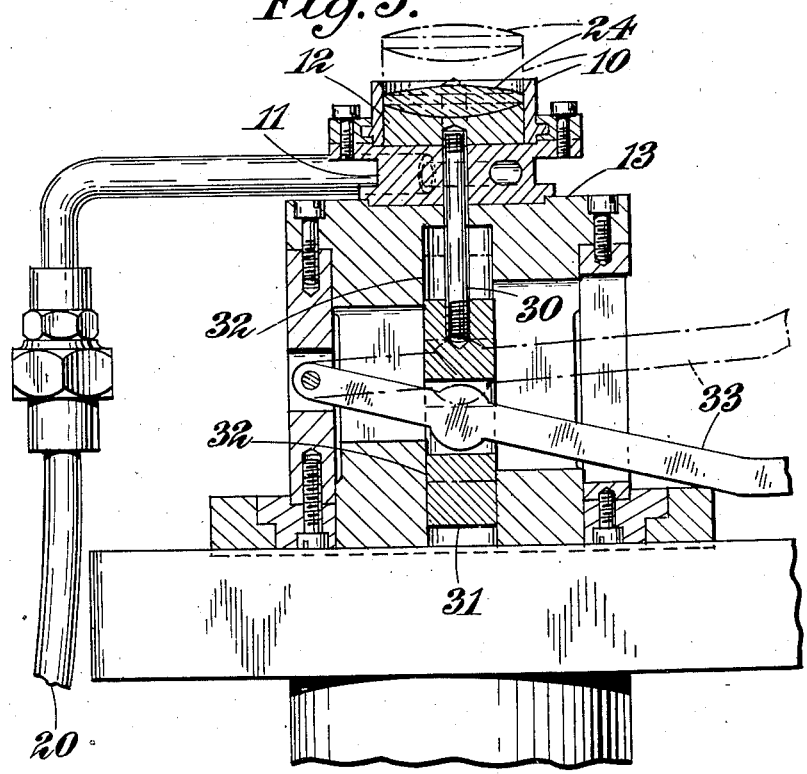
Arthur W. Kingston
Inventor Dec. 16, 1947.  A. W. KINGSTON  2,432,668
PRODUCTION OF OPTICAL LENSES, PRISMS, AND LIKE OPTICAL ELEMENTS
Filed Jan. 12, 1944  3 Sheets-Sheet 3

ARTHUR W. KINGSTON
INVENTOR
by his attorneys
Stebbins, Blenko & Webb

UNITED STATES PATENT OFFICE 2,432,668

PRODUCTION OF OPTICAL LENSES, PRISMS, AND LIKE OPTICAL ELEMENTS

Arthur William Kingston, Denham, England

Application January 12, 1944, Serial No. 517,944
In Great Britain March 16, 1942

3 Claims. (Cl. 18—55)

This invention relates to improvements in or relating to the production of optical lenses, prisms and like optical elements from certain thermoplastic materials such as those organic polymers (e. g. the resins methyl methacrylate, polystyrene, polyvinyl chloride) which in their final set form are transparent and quite uniform, stable and resistant to distortion or change of molecular structure. More particularly, it relates to an improved process of and apparatus for producing such optical elements whereby they shall be of a very high degree of accuracy as to their surfaces and dimensions, and whereby distortion or strain therein shall be avoided in the making thereof. The present invention comprises improvements upon the process and apparatus described in my Patent No. 2,314,838 dated March 23, 1943, and my application Serial No. 346,927, filed July 23, 1940, whereby lenses and other optical elements are moulded in a single operation from dies which are provided with optically accurate surfaces. This results in the production of corresponding surfaces in the moulded article which are of the high degree of optical accuracy associated with glass lenses such as are used in microscopes, telescopes, spectacles, photographic cameras and cinema projectors.

In accordance with the present invention, a solid workpiece of thermoplastic material such as mentioned above is first preformed by cutting, grinding or like mechanical operations, to a shape closely approximating to the final shape of the finished moulded article, and preferably it is then subjected to a slight polishing operation. The preformed blank is then preheated in a suitable heating device to a temperature suitable for moulding, whereupon it is immediately transferred to a mould of the closed mould type, wherein it is subjected to pressure between a pair of optically accurate dies, which are uniformly heated to the same temperature as the preheated preform. This results in a comparatively slight flow of the material of the preform, radially outwards, to cause its surfaces to conform to those of the dies, whereupon the heat is turned off and the dies cooled uniformly. The moulded article shrinks during cooling, and particular care is taken to ensure close contact between the die surfaces and the surfaces of the moulded article during shrinkage. This may be effected by holding one die stationary while subjecting the other to strong resilient pressure as by a powerful compressed spring. After the finished article has sufficiently cooled and set, it is removed from the mould.

With this procedure, all of the material of the workpiece is contained within the sleeve of the mould, there being substantially no extension or "flash" of material at or near the periphery of the dies. Also, no mechanical stop for the movement of the movable die is used, so that the latter is entirely free to follow up and maintain contact with the work during the shrinkage of the latter. The finished article, when set, constitutes the only stop, and the precise dimensions of the finished article are determined by the weight or volume of the preform, which are known or ascertained prior to its insertion in the mould.

With this procedure also various cooperative advantages are obtained. First, the removal of material from the original flat blank by cutting or other mechanical means, to produce a preform of nearly the curvature and size of the finished lens or other optical element ensures that at this stage the blank shall be free from strain or distortion if the original blank was thus free, and the fact that so little material remains to be moved under pressure in the mould, to reach the final dimensions, while the blank is uniformly heated and maintained at suitable plasticity, is a safeguard against the formation of internal strain during the moulding. For this latter purpose the regular and uniform heating of the blank up to the temperature of the dies, before the latter are brought into contact therewith, is of great importance, and this can best be accomplished, under accurate control, by preheating the preformed blank in a heating device separate from but close to the mould. Further, the heating and subsequent cooling of the dies by application through the backs of the dies (rather than from the sleeve) ensures uniform application of heat to the preform during the moulding thereof, and a uniform regular cooling thereof. This latter is important, not only because of the prevention of strain patterns in the article, but also because the spring-pressed die is thereby enabled to maintain contact with the entire surface of the article during its cooling. If, on the contrary, cooling effect was provided more or less quickly at the periphery of the moulded article than at its central portion, the peripheral portion would set before the centre, with the result that the follow up of the removable die would be stopped by the set periphery while the centre continued to shrink away from this die.

Also, the fact that so little material is caused to flow under pressure in the die makes it easier to predetermine the exact desired thickness of the lens or other optical element at different points, the weight or volume of the blank and the amount of shrinkage of a particular material being known. Further, in moulding a lens, the pressure is first applied centrally, by the two dies, in alignment, because of the curvature of the preform, so that the danger of cracking or straining the blank because of pressures applied at different points above and below, is avoided. Furthermore, the fact that the preform provides so little material to flow radially under pressure not only aids in preventing the formation of stress patterns; it also is a safeguard against the formation of a local "hot spot" at the point of first contact. This is for the reason that a considerable area of contact follows the first point contact very quickly, due to the slight difference between the radii of curvature of a preform surface which is being moulded and of the die surface which is moulding it.

As to the provision of a preformed blank free from internal strains, it is noted that during the original solidification or polymerization of the thermoplastic materials used they adopt a molecular structure which is normally uniform and free from such strains. If, now, lens curvature (or the "near curvatures" of the preform) were to be formed entirely by die pressure, from a flat blank of uniform thickness, in a closed mould, the product would generally be found to contain internal stress patterns of a harmful character, impairing the optical properties of the finished lens, this being true because excess displaced material is not free to flow out of the mould. When however the curved preform is formed by a cutting or other mechanical operation there is no such tendency to stress the material.

In the moulding operation also it is essential to avoid the formation of air pockets, and therefore the preformed workpiece must be of such a shape that free outlet for air is allowed towards the periphery of the die parts, during the moulding operation. This may be accomplished, where a convex lens surface is to be formed by a concave matrix, by giving the preformed workpiece a radius of curvature slightly less than that of the matrix. If, for example, the radius of curvature of the matrix is 10 cm., the radius of curvature of the surface of the workpiece might be, say, 9.5–9.8 cm. Conversely, the radius of curvature of a concave preform surface should be slightly greater than that of the corresponding convex surface of the die.

If the optical element produced is a prism of triangular cross-section one of the dies may have a V-shaped matrix while the other die is flat, and while the V-shaped matrix is of the exact configuration required in the finished prism, the workpiece which is inserted therein has a dihedral angle very slightly less than that of the matrix to prevent the formation of any air pockets during the moulding operation. Similar considerations apply to the formation of prisms having more than three sides.

The nature of this invention and of subsidiary features thereof will be appreciated from the following description by way of example of the method and apparatus used in the production of lenses from sheets of methyl methacrylate polymer or from polystyrene, reference being made to the accompanying drawings in which:

Figure 2 is a perspective view, partly in section, showing the lens-holding tongs and electric heating device, Figure 3 is a detail view in vertical section illustrating the operation of ejecting the lens from the press.

Figure 1:
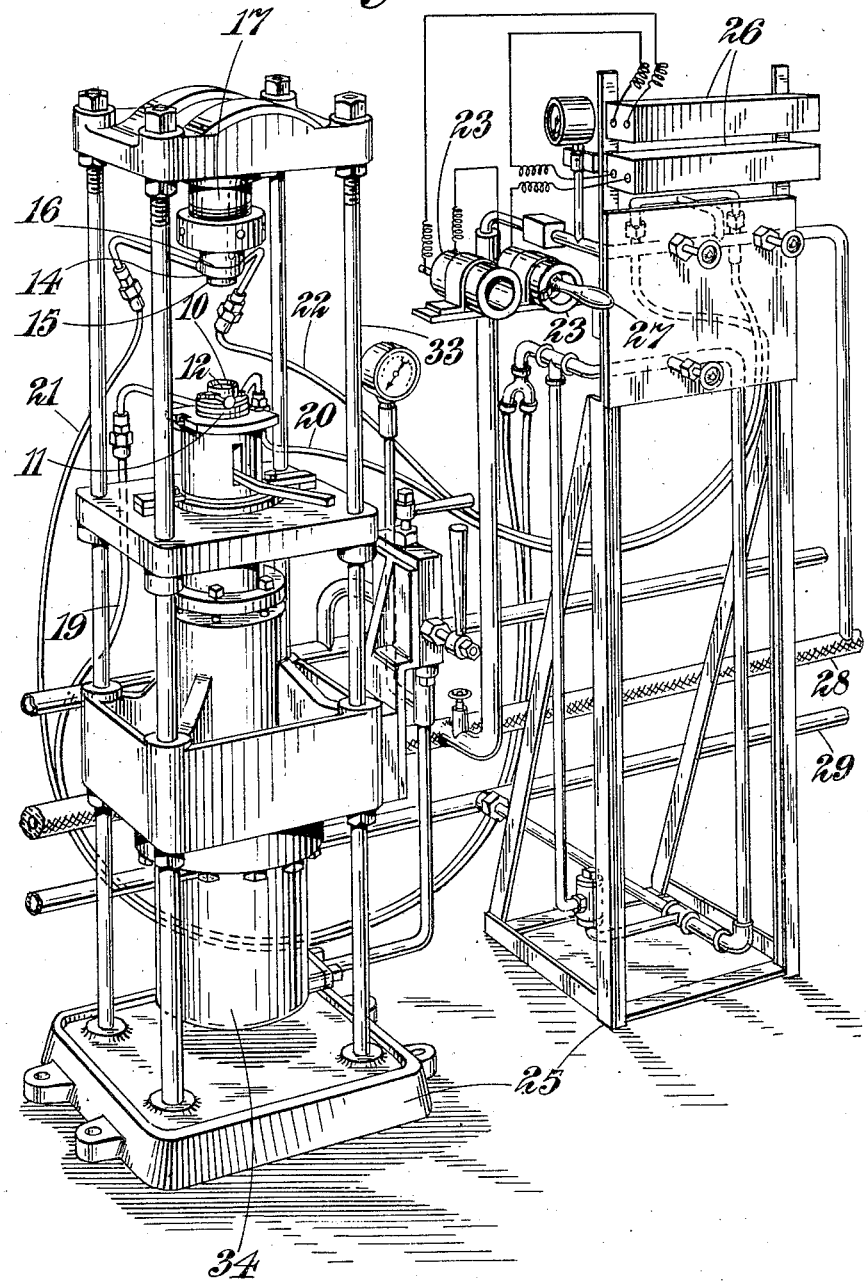
Figure 1 is a perspective view of the final moulding apparatus.
Figure 4:
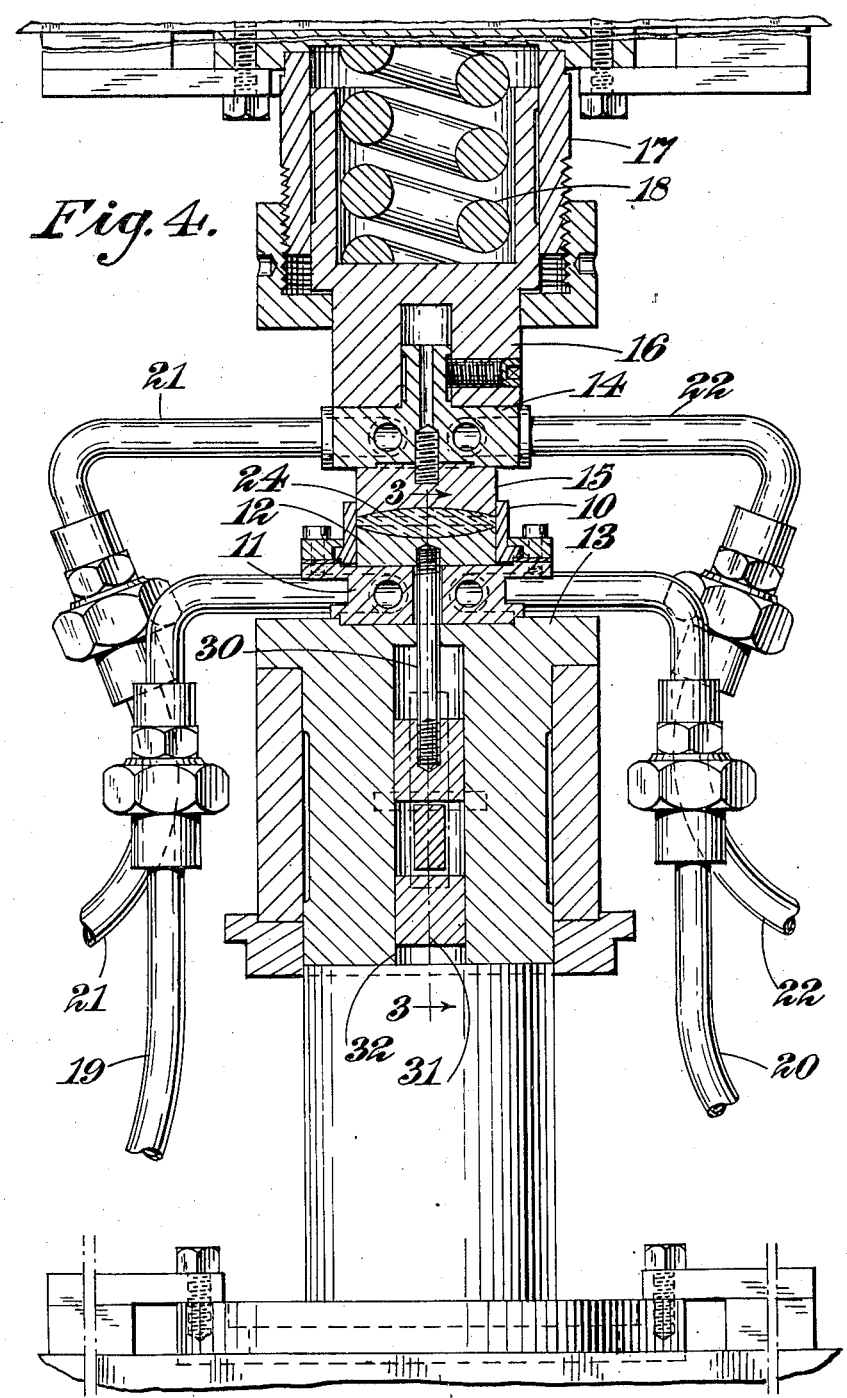
Figure 4 is a vertical sectional view of part of the press including the top and bottom dies and their associated parts, the lens being under pressure.

From a flat sheet of appropriate thickness circular blanks are cut out by a revolving trepanning cutter. Each blank is mounted in a chuck of a lathe and one face is turned to the appropriate curved surface profile by means of a shaped cutter and the surface thus cut may be ground. The circular blank is then reversed and the other face is similarly cut and ground to the appropriate curved surface. Water is a suitable lubricant for the cutting operation. Stops may be arranged to operate on the carriage of the lathe to ensure that the weight of the preformed blank is correct. The weight and/or dimensions of the preformed blank may also be checked.

Each preformed blank is polished on a rotary buffing machine, the objects being to remove the dust-retaining cavities, to obtain close contact with the dies and to facilitate examination of the surface for dust or other contamination or for surface markings.

The moulding press in its main essentials is of standard form. The cylindrical housing or sleeve 10 and the jacket 11 for the lower die 12 are mounted in the lower part of the press (in this example the movable part 13 which is power operated). The jacket 14 for the upper die 15 is mounted on the bottom of a plunger 16 which is accurately guided in a cylinder 17 (compression pot) on the upper part of the press, the cylinder being secured to a fixed abutment 17$^1$, and between plunger and cylinder is a powerful compression spring 18 tending to force the upper die 15 downwards. The lower die-holding jacket 11 is provided with fluid-circulating conduits 19 for cold water and 20 for steam. The upper die-holding jacket 14 is provided with fluid-circulating conduits 21 for cold water and 22 for steam. The passages in the jackets themselves are so disposed that the application of heat to the die or the extraction of heat from the die takes place through the back of the die. The operative faces of the dies are machined, ground and polished with a very high degree of accuracy. The back face of each die is also accurately ground to give perfect contact with the correspondingly ground surface of the jacket.

Electric ovens 23 are used for preheating the lens-blanks 24 and these ovens are preferably arranged within easy reach of the press operator. For example, for lenses of a maximum diameter 1 to 2 inches, ovens 23 may be mounted on the framework 25 of the press and electrically heated, the temperature being controlled by rheostats 26. A clean lens-blank is conveniently gripped in suitably shaped tongs 27 contacting only with the periphery of the blank and that part of the tongs holding the blank can be introduced into the oven. In the case of methyl methacrylate blanks the preheating temperature in the case of some lenses may be as high as 130°–140° C. although this depends to some extent on the size of the lens. In the case of polystyrene blanks the preheating temperature may be as high as 100°–110° C.

Means are employed to ensure that the air in the ovens is clean.

The fluid conduits in the die jackets are arranged to be put in communication with either a steam manifold 28 or a cooling water manifold 29.

Referring to Figure 3, the lower die 12 is coupled by a rod 30 to a yoke 31 vertically movable in guides 32 in the movable part 13 of the press. The yoke 31 engages the pivoted hand-lever 33 so that when the moulding operation is completed and the movable part 13 is lowered (by the standard hydraulic gear) the hand-lever 33 may be raised to eject and to press up the lower die 12 within the housing 10 and thus eject the finished lens.

The operation of moulding is as follows: Both the dies 12 and 15 and the blanks 24 are made optically clean. The blank 24 after preheating in the oven 23 is deposited in the lower die 12 which is embraced by the sleeve or housing 10 and by the normal operation of the press 34 contact is established between the blank 24 and both dies 12 and 15, the jackets of which, 11 and 16, at this stage are heated through the steam conduits 20 and 22 sufficiently to bring the dies to the moulding temperature, i. e. the same temperature as that of the preform. The pressure in the case of methyl methacrylate blanks is about 2 tons per square inch and in the case of polystyrene blanks is about 1 ton per square inch. The times of moulding at the high temperature above referred to vary somewhat with the dimensions of the lens but may be 2 to 3 minutes. Then the steam is turned off and the die-holding jackets 11 and 14 are cooled by the circulation of water through the conduits 19 and 21. It is at this stage that the upper die 15 makes the follow up. In other words the pressure is maintained during cooling and the action of the compressed spring 18 on the upper die 15 forces the surface of the dies to remain in perfect contact with the moulded surfaces of the lens 24 until solidification is complete. With lenses of 1 to 2 inches diameter the time of cooling under pressure may be 3 to 3½ minutes.

When the press is opened, the bottom die 12 is lifted out of the sleeve 10 by mechanically raising it. The edges of the periphery of the moulded lens may be slightly rough and may be readily smoothed.

The finished articles produced by the described process are free from harmful internal strain, are of desired thickness, have surfaces of the optical accuracy required for high class goods of the character referred to, and they will retain their shape and optical characteristics unimpaired for an indefinite time despite the usual temperature and atmosphere changes.

The required final thickness of the lens may be predetermined quite exactly, by making the preform of a calculated weight and volume together with knowledge, readily gained by experience with different materials, of the reduction in thickness which will result from the pressure under heat and the subsequent shrinkage during cooling.

I claim:

1. The process of making optical lenses having optically polished surfaces from transparent thermoplastic material of organic origin, which comprises cutting out a blank of desired peripheral configuration and dimensions from a flat sheet of such thermoplastic material, mechanically removing material from a face of said blank to produce thereon curved surfaces which differ but slightly from the final curved shape of the lens to be made, with a radius of curvature slightly less, when a convex optical surface is to be produced, and slightly greater, when a concave optical surface is to be produced, than the radius of curvature of the corresponding surface of the finished lens in each instance, inserting said preformed blank between optically polished dies in a closed mould, said dies having the radii of curvature which the finished lens is to have, heating said dies and blank to a temperature at which the latter becomes sufficiently plastic to flow under pressure, pressing the blank between said dies to cause a slight flow of the material thereof radially outward from the center, thereby to cause the blank to conform to the curvatures of the dies, cooling the dies and lens to cause the latter to set, and removing the moulded lens from between the dies.

2. The process of making optical lenses having optically polished surfaces from transparent thermoplastic material of organic origin, which comprises cutting out a blank of desired peripheral configuration and dimensions from a flat sheet of such thermoplastic material, mechanically removing material from a face of said blank to produce thereon curved surfaces which differ but slightly from the final curved shape of the lens to be made, with a radius of curvature slightly less, when a convex optical surface is to be produced, and slightly greater, when a concave optical surface is to be produced, than the radius of curvature of the corresponding surface of the finished lens in each instance, inserting said preformed blank between optically polished dies in a closed mould, said dies having the radii of curvature which the finished lens is to have, heating said dies and blank to a temperature at which the latter becomes sufficiently plastic to flow under pressure, pressing the blank between said dies to cause a slight flow of the material thereof radially outward from the center, thereby to cause the blank to conform to the curvatures of the dies, cooling the dies and lens to cause the latter to set, maintaining resilient pressure thereon during the cooling to maintain close contact of said element with said dies until shrinkage of the material of said element is completed, and removing the moulded lens from between the dies.

3. The process of making optical lenses having optically polished surfaces from transparent thermoplastic material of organic origin, which comprises cutting out a blank of desired peripheral configuration and dimensions from a flat sheet of such thermoplastic material, mechanically removing material from a face of said blank to produce thereon curved surfaces which differ but slightly from the final curved shape of the lens to be made, with a radius of curvature slightly less, when a convex optical surface is to be produced, and slightly greater, when a concave optical surface is to be produced, than the radius of curvature of the corresponding surface of the finished lens in each instance, inserting said preformed blank between optically polished dies in a closed mould, said dies having the radii of curvature which the finished lens is to have, heating said dies and blank to a temperature at which the latter becomes sufficiently plastic to flow under pressure, pressing the blank between said dies to cause a slight flow of the material thereof radially outward from the center, thereby to cause the blank to conform to the curvatures of the dies, cooling the dies and lens to cause the latter to set, maintaining pressure thereon during the cooling to maintain close contact of said lens with said dies until the shrinkage of the material of said lens is completed, the relative movement of said dies being stopped by the setting of the moulded lens, and removing the moulded lens from between the dies.

ARTHUR WILLIAM KINGSTON.

REFERENCES CITED

The following references are of record in the file of this patent:

UNITED STATES PATENTS

| Number | Name | Date |
|---|---|---|
| 445,285 | Egge | Jan. 27, 1891 |
| 493,808 | Bechtold | Mar. 12, 1893 |
| 1,048,227 | Straubel | Dec. 24, 1912 |
| 1,451,490 | Bugbee | Apr. 10, 1923 |
| 1,593,525 | Copeland | July 20, 1926 |
| 1,619,341 | Gagnan | Mar. 1, 1927 |
| 2,098,395 | Law | Nov. 9, 1937 |
| 2,166,215 | Lloyd | July 18, 1939 |
| 2,193,742 | Rohm et al. | May 12, 1940 |
| 2,232,475 | Renfrew et al. | Feb. 18, 1941 |
| 2,302,918 | Smith | Nov. 24, 1942 |
| 2,304,663 | Smith et al. | Dec. 8, 1942 |
| 2,319,014 | Smith | May 11, 1943 |